United States Patent [19]
Charron et al.

[11] 3,815,813
[45] June 11, 1974

[54] HOT WATER HEATING SYSTEM

[75] Inventors: Jean-Claude Charron, Saint-Maur; Francois Sagnard, Paris, both of France

[73] Assignee: Duval Saunier, Paris, France

[22] Filed: May 26, 1972

[21] Appl. No.: 257,157

[30] Foreign Application Priority Data
May 26, 1971 France .............................. 71.18994

[52] U.S. Cl. ................................... 236/23, 73/198
[51] Int. Cl. .......................... F24d 3/02, F24d 17/00
[58] Field of Search ............... 236/23, 78 A, 24, 25; 73/231 R, 198, 344

[56] References Cited
UNITED STATES PATENTS
| | | | |
|---|---|---|---|
| 2,671,174 | 3/1954 | Burgholz | 73/231 R X |
| 2,689,932 | 9/1954 | Hornfeck | 236/23 |
| 3,174,298 | 3/1965 | Kleiss | 236/23 X |

Primary Examiner—William E. Wayner
Attorney, Agent, or Firm—Kenway, Jenny & Hildreth

[57] ABSTRACT

In the hot water heating system disclosed herein, a sensing means such as a thermistor provides a first electrical control signal which represents deviation of outlet water temperature from preselected value and a flowmeter provides a pulsating electrical signal having a frequency which varies as a function of rate of flow through the heating system. An output signal is generated having a frequency equal to that of the pulsating signal and a squarewave pulse duration which varies as a function of the first control signal. Heater means are then energized by the output signal so as to provide a thermal input to the heating system which is substantially proportional to the product of water output temperature deviation and flow rate. This control minimizes output temperature fluctuations due to thermal inertia and heater lag.

4 Claims, 3 Drawing Figures

HOT WATER HEATING SYSTEM

BACKGROUND OF THE INVENTION

This invention relates to hot water heating systems and more particularly to such a system employing electronic control to minimize output temperature variation.

While various water heating systems providing temperature control have been proposed heretofore, these systems have typically had a limited range of control and have been subject to considerable output temperature variation in the presence of varying demand or flow through the water heating system. This fluctuation is due principally to the relatively high thermal inertia of the system elements, such as the heat exchanger, and the response time of the temperature sensors. Further, most prior art temperature controlled water heaters, particularly those operating with gas, are essentially mechanical in operation, i.e., incorporating a differential diaphragm using parts which slide through seals, and therefore have poor reliability because of wear and abrasion.

Among the several objects of the present invention may be noted the provision of a hot water heating system having novel temperature control means; the provision of such a system in which output temperature variations are minimized; the provision of such a system employing an electronic control of high reliability; the provision of such a system which is of relatively simple and inexpensive construction. Other objects and features will be in part apparent and in part pointed out hereinafter.

SUMMARY OF THE INVENTION

Briefly, the hot water heating system of the present invention employs sensing means for generating an electrical signal which varies as a function of the deviation of outlet water temperature from a preselected temperature. A flowmeter is employed to provide an electrical signal which varies as a function of the rate of water flow through the system. These two electrical signals are combined in means which generate an output signal which varies as a function of the product of deviation and flow rate. The burner or other heater means is then controlled by the output signal to provide a thermal input to the heating system which is substantially proportional to the product of temperature deviation and flow rate. Accordingly, temperature variation with varying demand is minimized.

DESCRIPTION OF THE PREFERRED EMBODIMENT

Figure 1:
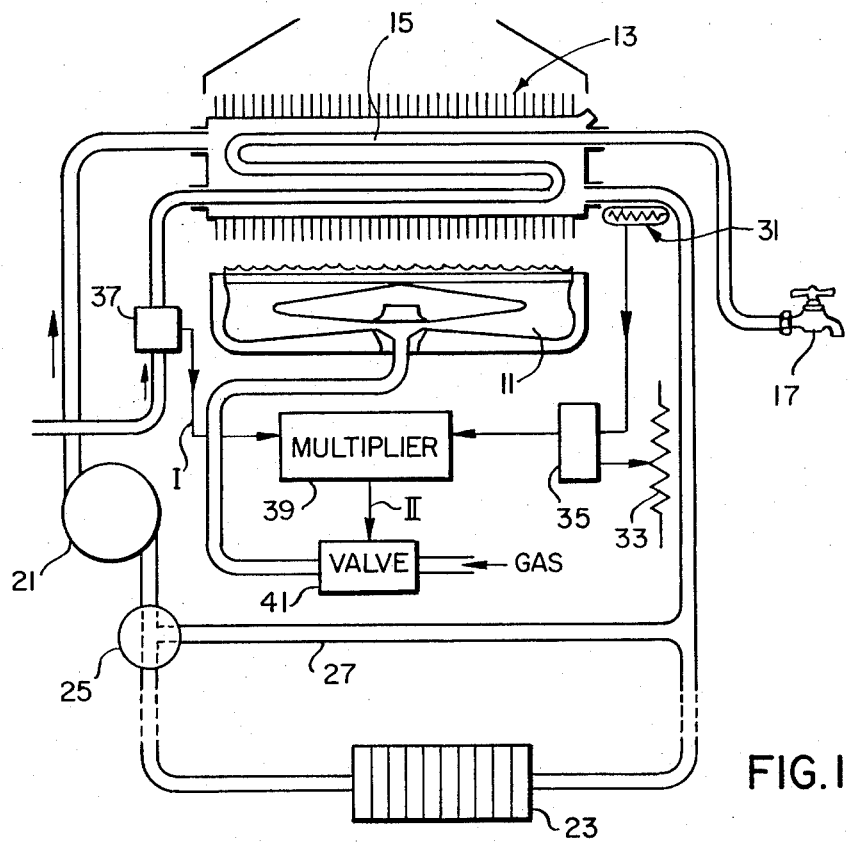
FIG. 1 is a schematic diagram of a hot water heating system of the present invention.

Referring now to FIG. 1, the heating system illustrated there is of the combined furnace and hot water heating type employing a single burner 11 for both purposes. A heat exchanger adjacent the burner is indicated at 13 and comprises two fluid circuits. The first is a tubular conduit 15 through which water flows to outlets, such as the faucet indicated at 17. The space around the conduit 15 is filled with the water which circulates through heating system radiators 23. This water is driven or circulated by a pump 21. A valve 25 and bypass conduit 27 permit the radiators to be selectively shunted for purposes described hereinafter.

Figure 2:
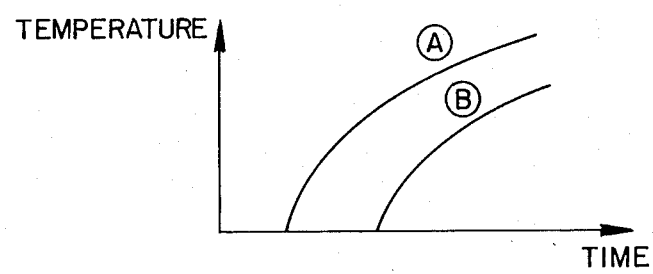
FIG. 2 is a graph illustrating the response times of two fluid circuits in the system of FIG. 1.

While immersing the hot water heating conduit 15 within the radiator water allows the hot water heating system to take advantage of or utilize the substantially larger heat storage capacity or thermal inertia of the radiator system, this arrangement does cause the temperature response of the liquid in conduit 15 to lag in time with respect to the water being provided to the radiator circuit. This is indicated in FIG. 2 where the temperature responses of the radiator and faucet circuits, designated A and B respectively, are indicated with respect to time following the starting of operation of the burner. Averaged over time, on the other hand, the outlet temperatures of the two circuits are substantially equal. Accordingly, the output temperature of the circuit A is taken as representative of the outlet temperature of both circuits in this combined system in order to minimize time lag effects. A sensor providing an electrical signal which varies as a function of this temperature is indicated at 31.

The sensor 31 may, for example, comprise a thermistor providing an electrical control signal which varies as a function of output temperature. A potentiometer 33 provides a reference signal representing the desired outlet temperature and these two signals are compared, as indicated at 35, to yield an output signal having an amplitude which varies as a function of deviation of the output temperature from the preselected temperature, i.e. that represented by the setting of potentiometer 33.

Figure 3:
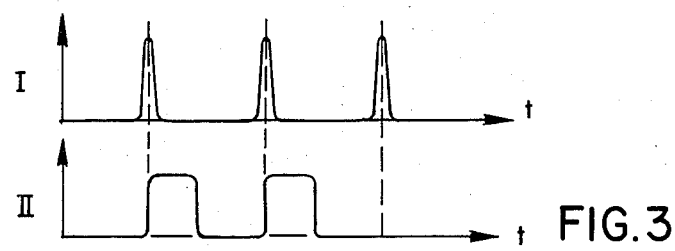
FIG. 3 is a diagram illustrating signals occurring in the control circuitry employed in the system of FIG. 1.

A flowmeter 37 provides a pulsating signal which varies as a function of the rate of flow of water through the hot water heating conduit 15. Flowmeter 37 may, for example, comprise a turbine wheel which is driven by the flowing liquid and which carries a plurality of magnets operating upon an adjacent reed switch in known manner. As is understood, such a flowmeter provides a pulsating signal having a frequency which varies as a function of the rate of flow through the flowmeter. Such a pulsating signal is indicated at I in FIG. 3.

The deviation signal and the pulsating signal generated by the flowmeter are applied to a multiplier circuit 39. Circuit 39 operates to generate a squarewave signal having a frequency which is equal to the flowmeter pulsation frequency with the duration of each squarewave pulse being variable as a function of the amplitude of the deviation or error signal provided by comparator circuit 35. Such a squarewave signal is indicated at II in FIG. 3. It can thus be seen that the percentage duty cycle of the resultant squarewave will vary as a function of the product of the deviation with the flow rate. In an analog embodiment, the multiplier 39 may comprise a so-called one-shot multivibrator together with associated driving and isolating circuitry. Wholly digital embodiments may also be constructed.

The squarewave output signal of the multiplier circuit 39 is applied to a burner control means, as indicated at 41. In the embodiment in which the burner 11 is a gas burner, the control means 41 may be the valve disclosed in the co-pending and co-assigned application of Jean-Claude Charron for a Proportional Control Valve For Gas Burners, Ser. No. 229,765, filed Feb. 28, 1972. That valve operates to provide a proportionally variable gas flow which is responsive to a pulse width modulated electrical control signal. In the case of an electrical heater, the squarewave output signal can control the thermal input by controlling a semiconductor device, such as a transistor, SCR or other thyristor device, so as to effect proportional control by pulse width modulation. In either case, the system operates to control the thermal input to the heater system in accordance with a function which varies as the product of the output temperature deviation with the heating water flow rate.

From the above, it can be seen that a given temperature deviation will cause only a relatively small thermal power input when the water flow rate is low but will cause a relatively high power input when the flow rate is high, even though the temperature deviation is still the same. Thus, a mechanism is provided for overcoming the effect of the thermal lag which is normally associated with conventional systems. In other words, the system does not have to wait until the deviation reaches a correspondingly large value before a high thermal input power is obtained. If desired, the valve 25 may be operated automatically to shunt the radiators 23 when water is drawn from the hot water heating system, e.g., through the faucet 17, so that variations in thermal demand are not complicated by the heat drain constituted by the radiators.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A hot water heating system comprising: sensing means for generating an electrical signal which varies as a function of the deviation of outlet water temperature from a preselected temperature;

a flowmeter providing a pulsating electrical signal having a frequency which varies as a function of the rate of water flow through the heating system;

means interconnected with and responsive to said sensing means and said flowmeter for generating a squarewave output signal having a frequency equal to said pulsating signal and a squarewave duration which varies as a function of said temperature deviation; and heater means controlled by said squarewave output signal for providing a thermal input to said heating system which is substantially proportional to the product of said deviation and said flow rate.

2. A hot water heating system as set forth in claim 1 wherein said sensing means includes a thermistor for providing an electrical signal which varies as a function of outlet temperature.

3. A hot water heating system as set forth in claim 2 further comprising means providing a reference signal representing said preselected temperature and means for combining said outlet temperature signal and said reference signal to obtain said deviation signal.

4. A hot water heating system as set forth in claim 1 wherein said heater means includes a gas burner and control means comprising a valve providing a proportionally variable flow of gas responsive to a pulse width modulated squarewave control signal.

* * * * *